(12) United States Patent
Tondreau

(10) Patent No.: US 8,051,989 B1
(45) Date of Patent: Nov. 8, 2011

(54) SUPPORT STRUCTURE FOR A FILTER

(75) Inventor: Alfred Tondreau, Saline, MI (US)

(73) Assignee: Davco Technology, LLC, Saline, MI (US)

( * ) Notice: Subject to any disclaimer, the term of this patent is extended or adjusted under 35 U.S.C. 154(b) by 348 days.

(21) Appl. No.: 12/463,459

(22) Filed: May 11, 2009

(51) Int. Cl.
*B01D 27/06* (2006.01)
*B01D 35/30* (2006.01)

(52) U.S. Cl. ............... 210/487; 210/493.4; 210/493.5; 210/494.1; 210/494.3; 210/497.1; 55/498; 55/520

(58) Field of Classification Search ............... 210/437, 210/440, 443, 485, 487, 493.1, 493.4, 493.5, 210/494.1, 494.3, 495, 497.01, 497.1, 497.2; 55/498, 520

See application file for complete search history.

(56) References Cited

U.S. PATENT DOCUMENTS

| | | | |
|---|---|---|---|
| 2,796,989 A | 6/1957 | Kovacs | |
| 3,370,708 A | 2/1968 | Hultgren et al. | |
| 3,486,626 A * | 12/1969 | Close | 210/493.1 |
| 4,154,688 A | 5/1979 | Pall | |
| 4,419,241 A * | 12/1983 | Hoffmann | 210/493.5 |
| 4,640,779 A | 2/1987 | Taki et al. | |
| 4,738,778 A * | 4/1988 | Taki et al. | 210/497.2 |
| 4,874,517 A * | 10/1989 | Esch | 210/494.3 |
| 4,878,929 A | 11/1989 | Tofsland et al. | |
| 5,174,895 A * | 12/1992 | Drori | 210/497.1 |
| 5,279,731 A | 1/1994 | Cook et al. | |
| 5,468,382 A | 11/1995 | Cook et al. | |
| 5,507,942 A | 4/1996 | Davis | |
| 5,824,232 A | 10/1998 | Asher et al. | |
| 5,980,759 A | 11/1999 | Proulx et al. | |
| 6,113,784 A | 9/2000 | Stoyell et al. | |
| 6,511,598 B2 | 1/2003 | Gershenson | |
| 6,511,599 B2 | 1/2003 | Jaroszczyk et al. | |
| 6,585,892 B2 | 7/2003 | Gershenson | |
| 6,598,749 B2 | 7/2003 | Paul et al. | |
| 6,841,065 B2 | 1/2005 | Smith et al. | |
| 7,462,282 B2 * | 12/2008 | Mees et al. | 210/493.1 |
| 2002/0027102 A1 | 3/2002 | Robillard | |
| 2004/0060858 A1 | 4/2004 | Lucas et al. | |
| 2006/0207929 A1 | 9/2006 | Epping et al. | |

* cited by examiner

*Primary Examiner* — Christopher Upton
(74) *Attorney, Agent, or Firm* — Young Basile Hanlon & MacFarlane, P.C.

(57) ABSTRACT

A support structure of a filter element for supporting a filter material that is adapted to filter a fluid includes a first frame portion and a second frame portion. The first frame portion has a plurality of radially-extending fingers that are longitudinally spaced from one another. The first frame portion is disposed entirely on an unfiltered side of the filter material. A second frame portion has a pair of longitudinally-extending support surfaces that are disposed in a spaced, facing relationship with respect to one another. The second frame portion is disposed entirely on a filtered side of the filter material. The radially-extending fingers of the first frame portion and each of the longitudinally-extending support surfaces of the second frame portion support the filter material to define a first radial channel. The radially-extending fingers of the first frame portion space the longitudinally-extending support surfaces of the second frame portion apart from one another.

20 Claims, 5 Drawing Sheets

US 8,051,989 B1

SUPPORT STRUCTURE FOR A FILTER

FIELD OF THE INVENTION

The invention relates to fluid filters, and more particularly, the invention relates to a support structure for a filter media that enhances the surface area of the filter media of a filter element by forming concentric filtering channels around and across the filter element.

BACKGROUND OF THE INVENTION

It is well known to utilize filters to remove contaminants from fluids. By way of example, fuel filter assemblies are used to filter fuel for an internal combustion engine of a motor vehicle. Filter assemblies typically comprise a sideways, upwardly or downwardly mounted canister having a porous filter media enclosed in the canister. For example, it is known to use porous filter media fabricated from paper, as well as porous filter media fabricated from cardboard. The liquid enters and fills or partially fills the canister so that all or a portion of the filter media is doused with the liquid as it passes through the filter media and exits the canister. As the liquid passes through the filter media, contaminants are retained by the filter media and thus removed from the fluid.

Since filtration is accomplished by passing the fluid from one side of the filter media to the opposite side of the filter media, the rate at which the filter is able to process a fluid is dictated by the surface area of the filter media and the porosity of the filter media. Thus, in order to maximize the processing capacity of a filter element having a particular porosity, various designs have been previously proposed that attempt to increase the surface area of the filter media by way of particular geometric configurations of the filter media, without increasing the overall size of the filter canister. However, since the filter media is typically fabricated from a porous material such as paper or cardboard, structure must be provided within the filter element to retain the filter media in a particular geometric configuration. These structures often impede fluid flow and are typically either difficult or labor-intensive to fabricate. Thus, it would be desirable to provide a structure that supported a filter media in a particular geometric configuration that did not impede fluid flow and was not difficult or labor-intensive to fabricate.

SUMMARY OF THE INVENTION

The invention provides a support structure of a filter element for supporting a filter material that is adapted to filter a fluid. The support structure includes a first frame portion and a second frame portion. The first frame portion is disposed entirely on an unfiltered side of the filter material and has a plurality of radially-extending fingers that are longitudinally spaced from one another. A second frame portion is disposed entirely on a filtered side of the filter material and has a pair of longitudinally-extending support surfaces that are disposed in a spaced, facing relationship with respect to one another. The radially-extending fingers of the first frame portion and each of the longitudinally-extending support surfaces of the second frame portion support the filter material to define a first radial channel. The radially-extending fingers of the first frame portion space the longitudinally-extending support surfaces of the second frame portion apart from one another. The filter material may be interposed between each of the radially-extending fingers of the first frame portion and each of the longitudinally-extending support surfaces of the second frame portion.

The first frame portion of the support structure may have a pair of longitudinally-extending support surfaces that are disposed in a spaced, facing relationship with respect to one another, and the second frame portion may have a plurality of radially-extending fingers that are longitudinally spaced from one another. The radially-extending fingers of the second frame portion and each of the longitudinally-extending support surfaces of the first frame portion support the filter element to define a second radial channel, wherein the filter material is interposed between each of the radially-extending fingers of the second frame portion and each of the longitudinally-extending support surfaces of the first frame portion. The radially-extending fingers of the second frame portion space the longitudinally-extending support surfaces of the first flame portion apart from one another.

The first frame portion and the second frame portion of the support structure may support the filter material to define a first circumferential channel that is in non-filtering fluid communication with the first radial channel, as well as a second circumferential channel that is in non-filtering fluid communication with the second radial channel. Furthermore, the first frame portion may have a plurality of longitudinally spaced ring members that are disposed within the first circumferential channel. Each ring member of the first frame portion is connected to both of the longitudinally-extending support surfaces of the first frame portion and to one of the radially-extending fingers of the first frame portion to support the radially-extending fingers of the first frame portion with respect to the longitudinally-extending support surfaces of the first frame portion. Similarly, the second frame portion may have a plurality of longitudinally spaced ring members that are disposed within the second circumferential channel. Each ring member of the second frame portion is connected to both of the longitudinally-extending support surfaces of the second frame portion and to one of the radially-extending fingers of the second frame portion to support the radially-extending fingers of the second frame portion with respect to the longitudinally-extending support surfaces of the second frame portion. In such an embodiment, the first radial channel may provide non-filtering fluid communication between an exterior of the filter element and the first circumferential channel, while the second radial channel provides non-filtering fluid communication between an inner core of the filter element and the second circumferential channel. Alternatively, the first radial channel may provide non-filtering fluid communication between an inner core of the filter element and the first circumferential channel, while the second radial channel provides non-filtering fluid communication between an exterior of the filter element and the second circumferential channel.

The support structure may include a top end cap and a bottom end cap, wherein the longitudinally-extending support surfaces of the second frame portion extend from the top end cap to the bottom end cap. Furthermore, the first radial channel may extend from the top end cap to the bottom end cap.

The longitudinally-extending support surfaces of the second frame portion may be substantially rectangular. Furthermore, the radially-extending fingers of the first frame portion may be substantially planar. In addition, the radially-extending fingers of the first frame portion may be substantially rectangular. Furthermore, the radially-extending fingers of the first frame portion may extend substantially perpendicular to the longitudinally-extending support surfaces of the second frame portion.

BRIEF DESCRIPTION OF THE DRAWINGS

The description herein makes reference to the accompanying drawings, wherein like-referenced numerals refer to like parts throughout the several views and wherein.

DETAILED DESCRIPTION OF THE INVENTION

Figure 1:
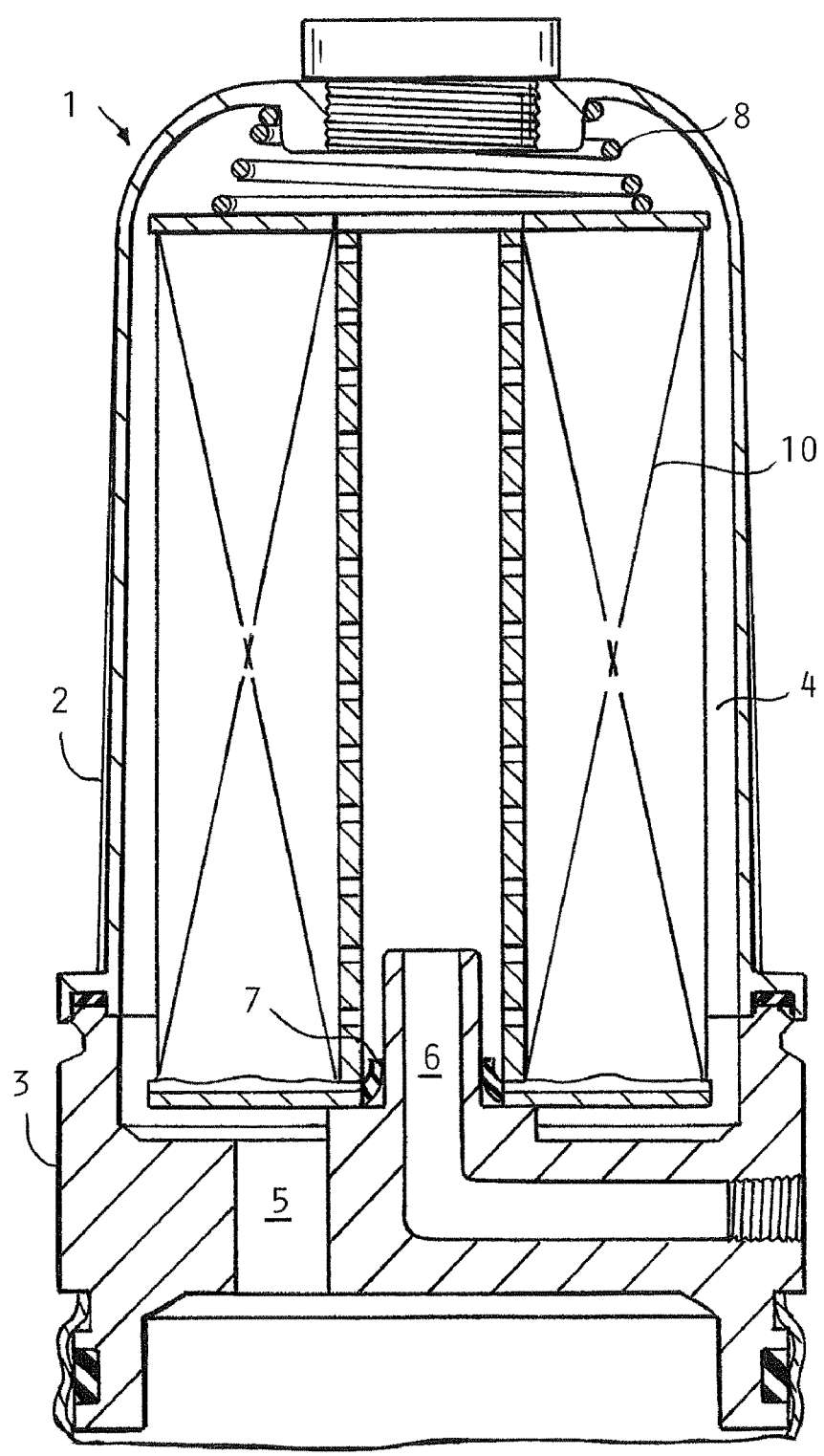
FIG. 1 is sectional side view of a fluid filter assembly utilizing a fluid filter according to the present invention.

Referring to the drawings, the invention will now be described in detail with reference to the exemplary embodiment.

FIG. 1 shows a fluid filter 10 that may be used in conjunction with a fluid filter assembly 1 for filtering and processing fluids including, but not limited to, diesel fuel, gasoline, oil, water, air, and antifreeze. The fluid filter assembly 1 includes a substantially cylindrical, upright housing 2 that is connected to a base portion 3 to define an enclosed interior space 4 of the fluid filter assembly 1. The base portion 3 may be connected to a lower fluid storage portion (not shown). The fluid filter 10 is adapted to be disposed within the enclosed interior space 4 and in engagement with the base portion 3. A fluid inlet 5 is formed in the base portion 3 and is adapted to supply fluid into the enclosed interior space 4 for contact with the fluid filter 10. A fluid outlet 6 includes a tube like member formed near the center of the base portion 3 so that the fluid outlet 6 may extend into the fluid filter 10 to receive and direct filtered fluid outwardly away from the fluid filter assembly 1. A seal 7 is provided between the fluid outlet 6 and the fluid filter 10 to prohibit filtered and unfiltered fluid from mixing. A spring 8 at the top of the housing 2 engages the fluid filter 10 to maintain the fluid filter 10 in a sealed relationship with the base portion 3. In the foregoing, the fluid filter assembly 1 is described as an outside-to-inside fluid filter assembly 1, wherein fluid is filtered by moving from the exterior of fluid filter 10 to the interior of the fluid filter 10. However, it should be understood that the fluid filter 10 may also be used in conjunction with an inside-to-outside fluid filter assembly 1, wherein fluid is filtered by moving the fluid from the interior of the fluid filter 10 to the exterior of the fluid filter 10, in which case, the roles of the fluid inlet 5 and the fluid outlet 6 would be reversed. Although the fluid filter 10 of the invention is ideally suited for the fluid filter assembly 1 as shown, it should be noted that the invention is not limited to use in the fluid filter assembly 1, but rather, the fluid filter 10 of the invention may be utilized in any fluid filter assembly wherein a fluid filter 10 as described herein may be utilized.

Figure 2:
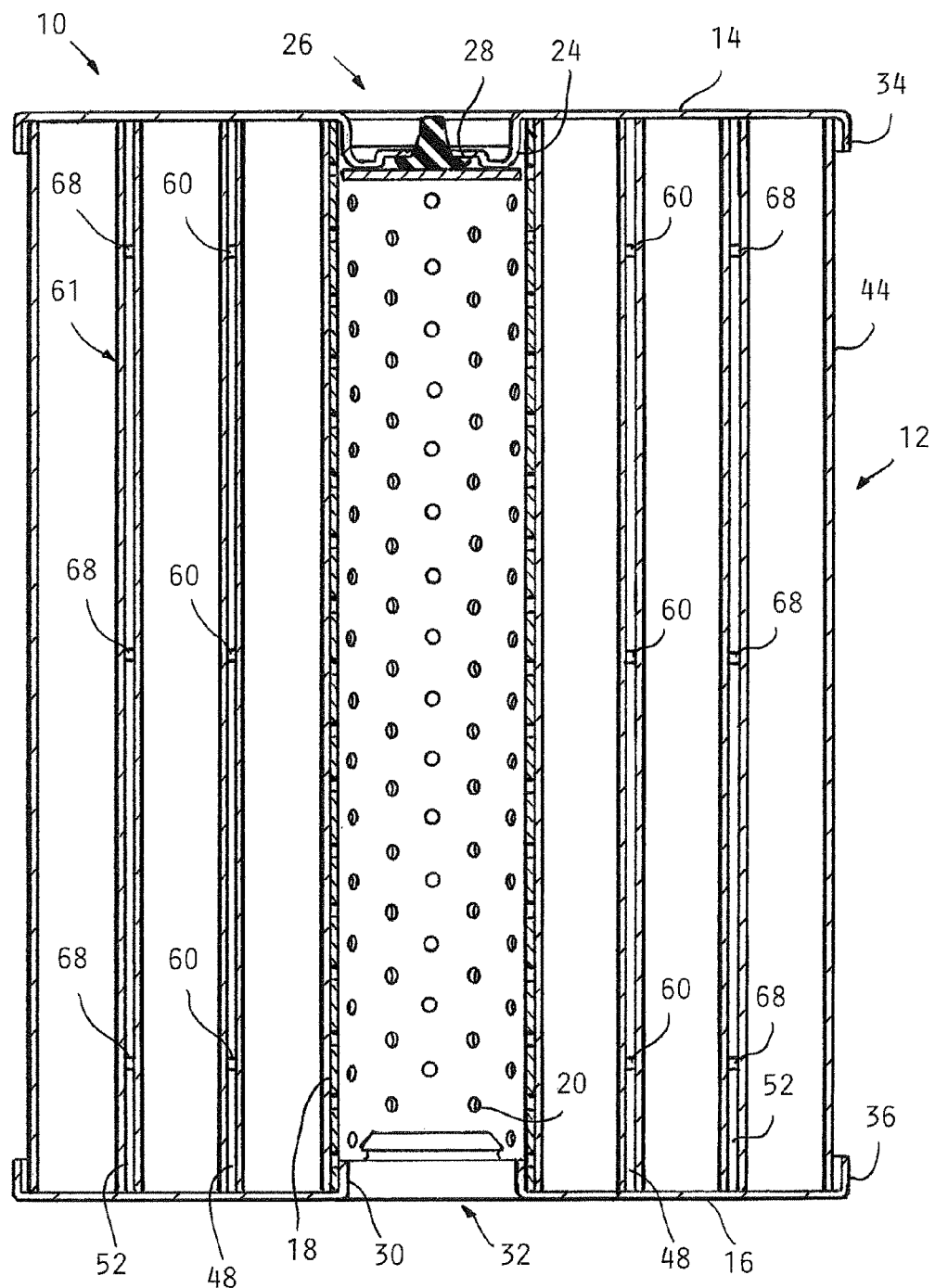
FIG. 2 is sectional side view of the fluid filter of the present invention.

As shown in FIG. 2, the fluid filter 10 includes a substantially cylindrical filter element 12 that is supported in a desired geometric configuration by a support structure 61. The filter element 12 is fabricated from a substantially continuous, one-piece sheet of a filter material or media 38 and is disposed between a substantially cylindrical top end cap 14 and a substantially cylindrical bottom end cap 16 of the fluid filter 10. Filtering fluid communication is provided through the filter element 12 between an exterior 44 of the filter element 12 and a substantially hollow inner core 22 of the filter element 12 that extends longitudinally through the fluid filter 10 from the top end cap 14 to the bottom end cap 16. As specifically defined herein, filtering fluid communication is defined as fluid communication between two points, wherein the fluid passes through the filter material 38 of the filter element 12 as it travels between the two points during normal operation of the fluid filter 10.

In order to support the filter material 38 of the filter element 12, the support structure 61 includes a first or inner frame portion 60 and a second or outer frame portion 68. The inner frame portion 60 and the outer frame portion 68 cooperate to support the filter material 38 such that the filter material 38 defines a first or inner circumferential filtering channel 48 of the filter element 12 and a second or outer circumferential filtering channel 52 of the filter element 12. The inner circumferential filtering channel 48 and the outer circumferential filtering channel 52 are in filtering fluid communication with each other. Additionally, the inner circumferential filtering channel 48 is in filtering fluid communication with the inner core 22 of the filter element 12, and the outer circumferential filtering channel 52 is in filtering fluid communication with the exterior 44 of the filter element 12. The inner circumferential filtering channel 48 is in non-filtering fluid communication with the exterior 44 of the filter element 12. The outer circumferential filtering channel 52 of the filter element 12 is in non-filtering fluid communication with the inner core 22 of the filter element 12. As specifically defined herein, non-filtering fluid communication means fluid communication between two points, wherein the fluid does not pass through the filter material 38 of the filter element 12, as it travels between the two points during normal operation of the fluid filter 10.

To further support the filter material 38 of the filter element 12, the top end cap 14 is longitudinally spaced from the bottom end cap 16 by the filter element 12, the inner and outer frame portions 60, 68, and a core tube 18. The core tube 18 is substantially cylindrical, surrounds the inner core 22 and has a plurality of perforations 20 formed therein to allow fluid flow to pass from the inner core 22 into either of the inner circumferential filtering channel 48 or the outer circumferential filtering channel 52, as will be explained in detail herein.

In order to retain the top end cap 14 upon the core tube 18, one end of the core tube 18 matingly engages a circumferential wall 24 of a recessed portion 26 of the top end cap 14. Likewise, the core tube 18 matingly engages a circumferential wall 30 of a port 32 of the bottom end cap 16 through which fluid may exit the inner core 22 of the fluid filter 10. Optionally, a pressure relief valve 28 may be provided in the recessed portion 26 of the top end cap 14, if desired. An outer circumferential wall 34 is also provided on the top end cap 14 to engage and retain the filter element 12. Similarly, in order to retain the filter element 12 upon the bottom end cap 16, an outer circumferential wall 36 is also provided on the bottom end cap 16. Although it has been described herein that the circumferential walls 24, 30 and the outer circumferential walls 34, 36 of the top end cap 14 and the bottom end cap 16 serve to retain the filter element 12, it should be understood that these elements are not necessary and could be omitted. For example, the filter element 12 could be retained with respect to the top end cap 14 and the bottom end cap 16 by other methods or structures, such as adhesives.

Figure 3:
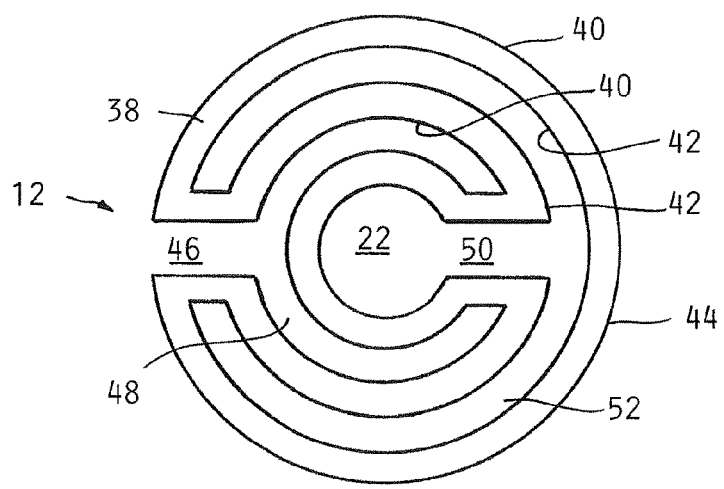
FIG. 3 is an illustration showing the geometric configuration of a filter element according to the present invention.

To allow the filter element 12 to remove and filter contaminants from the fluid, the filter material 38 may be a sheet of porous material that has its ends connected together to form a continuous loop, wherein the sizes of the pores of the filter material 38 are selected to provide a desired level of filtration of the fluid. In particular, the filter material 38 may be a two-sided sheet material having a first side 40 and a second side 42, as best seen in FIG. 3. In order to increase the surface area of the filter material 38 available for fluid filtering, the filter material 38 is configured into three substantially concentric circular rings to define at least two circumferential channels, namely, the first circumferential filtering channel 48 and the second circumferential filtering channel 52. Fluid is filtered by passing through the filter material 38 from the first side 40 of the filter material 38 to the second side 42 of the filter material 38 or vice-versa.

Fluid flow into and out of the circumferential filtering channels 48, 52 is accommodated by providing a first radial flow channel 46 and a second radial flow channel 50, each of which extends the longitudinal length of the filter material 38 from the bottom end cap 16 to the top end cap 14. The first radial flow channel 46 extends radially inward from the exterior 44 of the filter element 12 to the inner circumferential filtering channel 48 and provides non-filtering fluid communication between the exterior 44 of the filter element 12 and the inner circumferential filtering channel 48. The first side 40 of the filter material 38 faces both the first radial flow channel 46 and the inner circumferential filtering channel 48. The second radial flow channel 50 extends radially outward from the inner core 22 of the filter element 12 to the outer circumferential filtering channel 52 and provides non-filtering fluid communication between the inner core 22 of the filter element 12 and the outer circumferential filtering channel 52. The second side 42 of the filter material 38 faces both the second radial flow channel 50 and the outer circumferential filtering channel 52.

Figure 4:
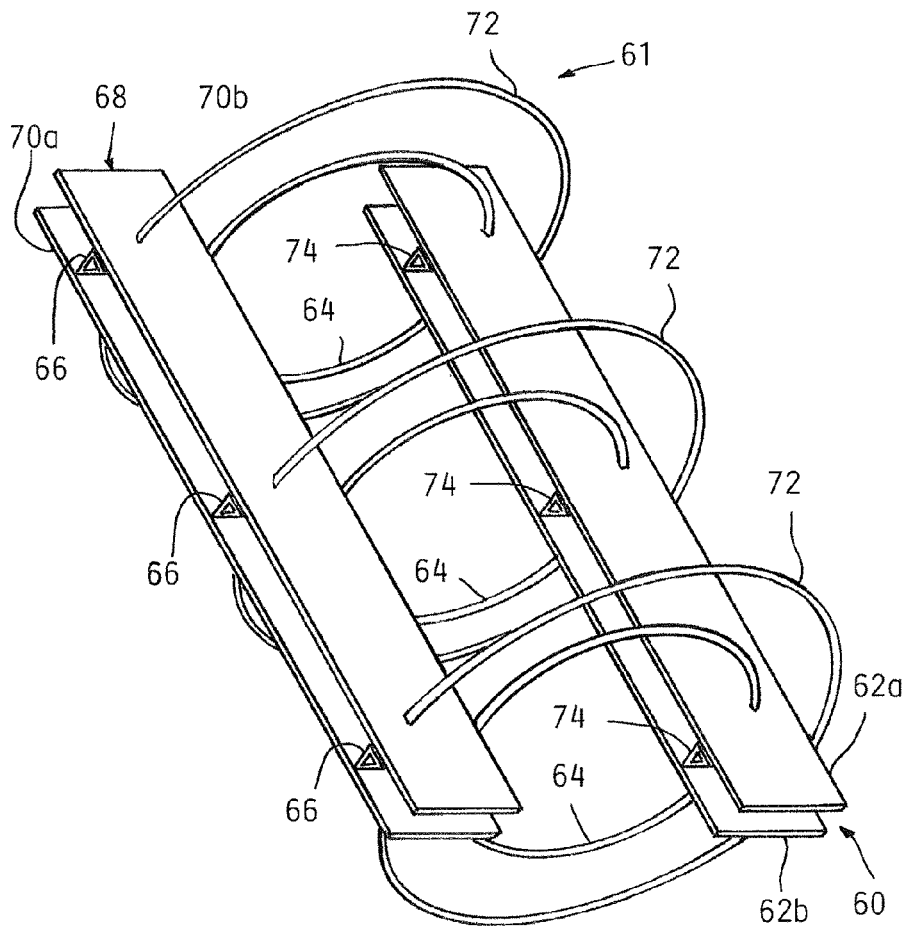
FIG. 4 is a perspective view showing a support structure for the filter element of the present invention.

In order to define the first radial flow channel 46, the inner circumferential filtering channel 48, the second radial flow channel 50, and the outer circumferential filtering channel 52, the fluid filter 10 provides the support structure 61, which includes the inner frame portion 60 and the outer frame portion 68, as shown in FIG. 4. The inner frame portion 60 has a first pair of longitudinal support members 62a, 62b, a first plurality of ring members 64, and a first plurality of radially-extending fingers 66. The longitudinal support members 62a, 62b are substantially rectangular and planar elements that, when installed in the fluid filter 10, extend from the top end cap 14 to the bottom end cap 16 and are parallel to the longitudinal axis of the filter element 12. Furthermore, the longitudinal support members 62a, 62b extend substantially parallel to one another. The first plurality of ring members 64 each extend from one of the longitudinal support members 62a to the other longitudinal support member 62b to space the longitudinal support members 62a, 62b with respect to one another. In particular, each of the ring members 64 has a substantially semicircular configuration that ends at the longitudinal support members 62a, 62b. The ring members 64 are longitudinally and substantially equally spaced with respect to one another along the length of the longitudinal support members 62a, 62b and along the longitudinal axis of the filter element 12, and are substantially parallel to one another. In FIG. 4, the inner frame portion 60 is depicted as having three ring members 64. However, it should be understood that the inner frame portion 60 could be provided with as many as or as few ring members 64 as desired. Each of the ring members 64 of the inner frame portion 60 has a radially-extending finger 66 connected thereto to assist in supporting the opening of the first radial flow channel 46. The fingers 66 are disposed opposite the longitudinal support members 62a, 62b and extend radially outward with respect to the ring member 64. However, it should be understood that other orientations could be provided for the fingers 66.

The outer frame portion 68 is substantially similar in construction to the inner frame portion 60 and has a second pair of longitudinal support members 70a, 70b, a second plurality of ring members 72, and a second plurality of radially-extending fingers 74. The longitudinal support members 70a, 70b are substantially identical in construction to the first pair of longitudinal support members 62a, 62b. Likewise, the second plurality of ring members 72 are substantially identical in construction to the first plurality of ring members 64, with the exception that the second plurality of ring members 72 are larger in diameter than the first plurality of ring members 64. The second plurality of fingers 74 are disposed opposite the longitudinal support members 70a, 70b and extend radially inward from the second plurality of ring members 72 to assist in supporting the opening of the second radial flow channel 50. However, it should be understood that other orientations could be provided for the second plurality of fingers 74.

Figure 5:
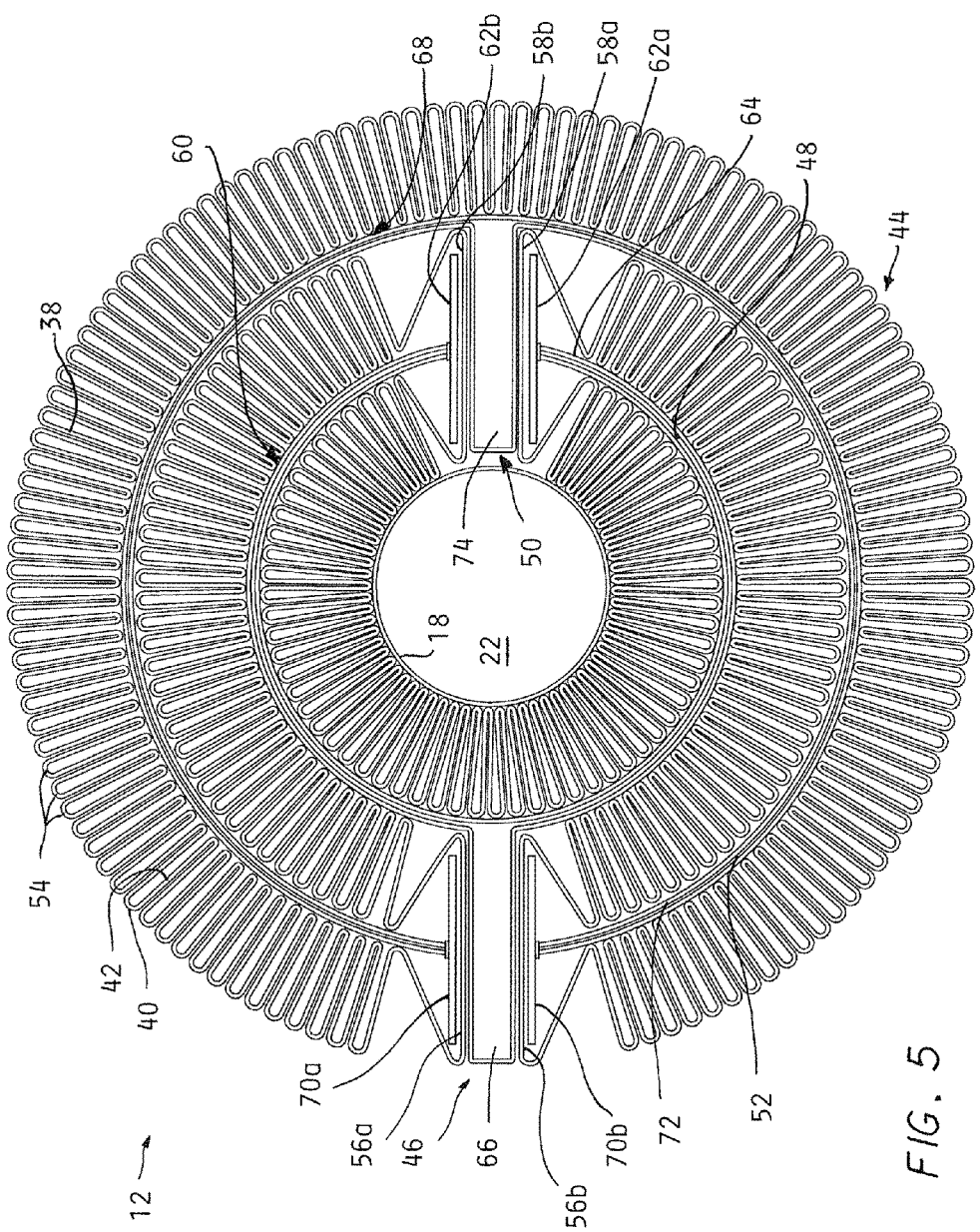
FIG. 5 is a sectional top view showing the filter element and the support structure of the present invention.

As shown in FIG. 5, the inner frame portion 60 and the outer frame portion 68 nest with respect to one another to support the filter element 12 and thereby define the radial flow channels 46, 50 and the circumferential filtering channels 48, 52. The filter material 38 is wrapped about the inner frame portion 60 and the outer frame portion 68 and may define a plurality of pleats 54 that are aligned radially to further increase the surface area of the filter material 38 used in the filter element 12.

In order to define the inner circumferential filtering channel 48, the first plurality of ring members 64 are disposed within the inner circumferential filtering channel 48. Accordingly, the first side 40 of the filter material 38 faces the first plurality of ring members 64, as well as the remainder of the inner frame portion 60. In similar fashion, the second plurality of ring members 72 of the outer frame portion 68 are disposed within the outer circumferential filtering channel 52, thus defining the outer circumferential filtering channel 52. Accordingly, the second side 42 of the filtering material 38 faces the second plurality of ring members 72 as well as the remainder of the outer frame portion 68.

To provide substantially unobstructed, non-filtering fluid communication between the exterior 44 of the filter element 12 and the inner circumferential filtering channel 48, the second pair of longitudinal support members 70a, 70b of the outer frame portion 68 engage the filter material 38 to define a pair of first bridge sections 56a, 56b constructed from the filter material 38 of the filter element 12. The pair of first bridge sections 56a, 56b extends from the exterior 44 of the filter element 12 to the inner circumferential filtering channel 48. Thus, the pair of first bridge sections 56a, 56b are disposed along the periphery of the first radial flow channel 46. In order to space the second pair of longitudinal support members 70a, 70b with respect to one another and thereby hold the first radial flow channel 46 open, the first plurality of fingers 66 of the inner frame portion 60 extend radially outward from the ring members 64 into the first radial flow channel 46 at longitudinally spaced locations. The fingers 66 engage the pair of first bridge sections 56a, 56b and thus indirectly engage the second pair of longitudinal support members 70a, 70b to space the first bridge sections 56a, 56b, as well as the second pair of longitudinal support members 70a, 70b, with respect to one another.

In order to provide substantially unobstructed, non-filtering fluid communication between the inner core 22 and the outer circumferential filtering channel 48, the first pair of longitudinal support members 62a, 62b of the inner frame portion 60 engage the filter material 38 to define a pair of second bridge sections 58a, 58b fabricated from the filter material 38 of the filter element 12. The pair of second bridge sections 58a, 58b extends from the inner core 22 of the filter element 12 to the outer circumferential filtering channel 52. Thus, the pair of second bridge sections 58a, 58b are disposed along the periphery of the second radial flow channel 50. In order to space the first pair of longitudinal support members 62a, 62b with respect to one another and thereby hold the second radial flow channel 50 open, the second plurality of fingers 74 of the outer frame portion 68 extend radially inward from the ring members 72 into the second radial flow channel 50 at longitudinally spaced locations. The fingers 74 engage the pair of second bridge sections 58a, 58b and thus indirectly engage the second pair of longitudinal support members 70a, 70b to space the second bridge sections 58a, 58b, as well as the second pair of longitudinal support members 70a, 70b, with respect to one another.

Figure 6A:
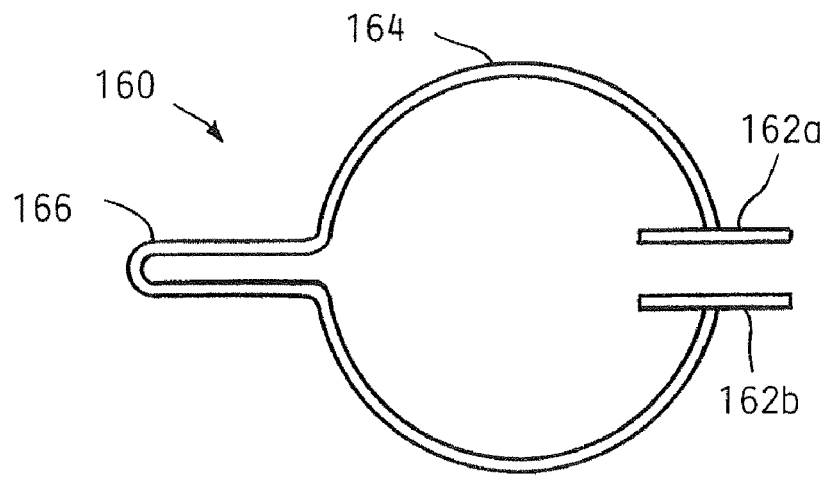
FIG. 6A is a top view of an inner frame portion according to an alternative embodiment of the present invention.
Figure 6B:
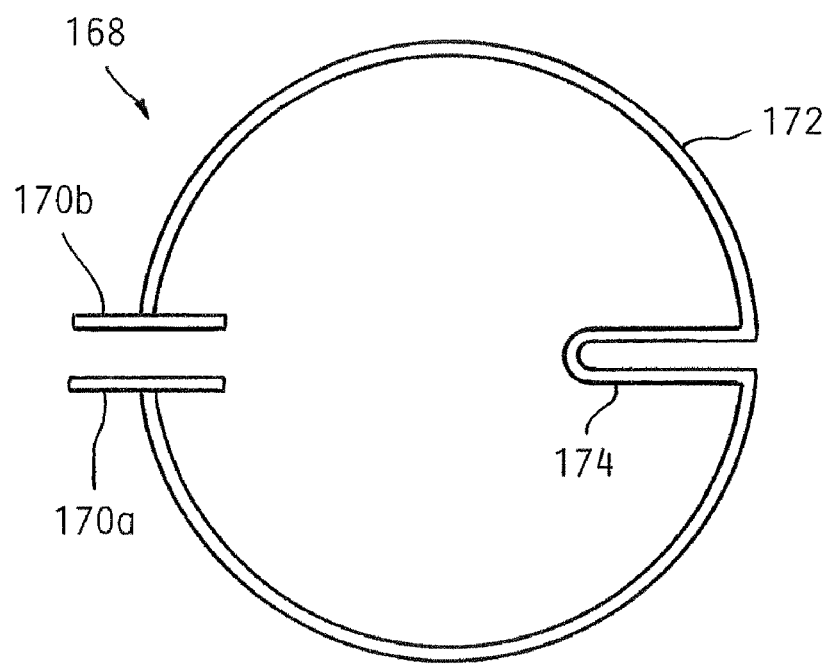
FIG. 6B is a top view of an outer flame portion according to an alternative embodiment of the present invention.

It should be understood that the inner frame portion 60 and the outer frame portion 68 are not necessarily limited to the specific geometries shown and described herein. By way of example, FIG. 6A shows an inner frame portion 160 according to an alternative embodiment, and FIG. 6B shows an outer frame portion 168 according to the alternative embodiment. The inner frame portion 160 includes longitudinal support members 162a, 162b and ring members 164 similar to those previously described. However, the inner frame portion 160 includes radially-extending fingers 166 that are elongated, substantially U-shaped structures formed along the circumferential length of the ring members 164 extending radially outward therefrom. In similar fashion, the outer frame portion 168 includes longitudinal support members 170a, 170b, ring members 172, and radially-extending fingers 174 that are elongated, substantially U-shaped structures formed along the circumferential length of the ring members 164 extending radially inward therefrom.

In use, a user wishing to filter a fluid installs the fluid filter 10 into the fluid filter assembly 1 and initiates a filtering operation of the fluid filter assembly 1. If the fluid filter assembly 1 is an outside to inside flow fluid filter assembly 1, fluid flows through the fluid inlet 5, enters the enclosed interior space 4 and contacts the filter element 12 adjacent to the exterior 44 of the filter element 12. Fluid also passes through the first radial flow channel 46 and into the inner circumferential filtering channel 48 before passing through the filter material 38. Upon passing through the filter material 38, the fluid proceeds into the outer circumferential filtering channel 52 and then proceeds to the inner core 22 by passing through the perforations 20 in the core tube 18 or proceeds directly to the inner core 22 by passing through a portion of the filter material 38 that is disposed between the ring members 64 and the core tube 18. Finally, the fluid flows through the port 32 of the fluid filter 10 and exits the fluid filter assembly 1 through the fluid outlet 6.

Alternatively, if the fluid filter assembly 1 is an inside to outside flow fluid filter assembly 1, fluid enters the filter element 12 through the port 32 and contacts the filter element 12 adjacent to the inner core 22 and passes through the second radial flow channel 50 and into the outer circumferential filtering channel 52 before passing through the filter material 38. Upon passing through the filter material 38, the fluid proceeds into the inner circumferential filtering channel 48 and then proceeds to the enclosed interior space 4 of the fluid filter assembly 1. Alternatively, the fluid may proceed directly to the enclosed interior space 4 by passing through a portion of the filter material 38 that is disposed between the outer circumferential filtering channel 52 and the exterior 44 of the filter element 12. Upon reaching the enclosed interior space 4, the fluid exits the fluid filter assembly 1 through the fluid outlet 5.

While the invention has been described in connection with what is presently considered to be the most practical and preferred embodiment, it is to be understood that the invention is not to be limited to the disclosed embodiments, but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A support structure of a filter element for supporting a filter material that is adapted to filter a fluid, the support structure comprising:
   a first frame portion having a plurality of radially-extending fingers that are longitudinally spaced from one another, the first frame portion disposed entirely on an unfiltered side of the filter material;
   a second frame portion having a pair of longitudinally-extending support surfaces that are disposed in a spaced, facing relationship with respect to one another, the second frame portion disposed entirely on a filtered side of the filter material; and
   the radially-extending fingers of the first frame portion and each of the longitudinally-extending support surfaces of the second frame portion support the filter material to define a first radial channel, wherein the radially-extending fingers of the first frame portion space the longitudinally-extending support surfaces of the second frame portion apart from one another.

2. The support structure of claim 1, wherein the filter material is interposed between each of the radially-extending fingers of the first frame portion and each of the longitudinally-extending support surfaces of the second frame portion.

3. The support structure of claim 2, further comprising:
   the first frame portion having a pair of longitudinally-extending support surfaces that are disposed in a spaced, facing relationship with respect to one another;
   the second frame portion having a plurality of radially-extending fingers that are longitudinally spaced from one another; and
   the radially-extending fingers of the second frame portion and each of the longitudinally-extending support surfaces of the first frame portion support the filter material to define a second radial channel, wherein the filter material is interposed between each of the radially-extending fingers of the second frame portion and each of the longitudinally-extending support surfaces of the first frame portion, and the radially-extending fingers of the second frame portion space the longitudinally-extending support surfaces of the first frame portion apart from one another.

4. The support structure of claim 3, further comprising:
   the first frame portion and the second frame portion support the filter material to define a first circumferential channel in non-filtering fluid communication with the first radial channel;
   the first frame portion having a plurality of longitudinally spaced ring members disposed within the first circumferential channel, each ring member of the first frame portion connected to both of the longitudinally-extending support surfaces of the first frame portion and to one of the radially-extending fingers of the first frame portion to support the radially-extending fingers of the first frame portion with respect to the longitudinally-extending support surfaces of the first frame portion;

the first frame portion and the second frame portion support the filter material to define a second circumferential channel in non-filtering fluid communication with the second radial channel; and the second frame portion having a plurality of longitudinally spaced ring members disposed within the second circumferential channel, each ring member of the second frame portion connected to both of the longitudinally-extending support surfaces of the second frame portion and to one of the radially-extending fingers of the second frame portion to support the radially-extending fingers of the second frame portion with respect to the longitudinally-extending support surfaces of the second frame portion.

5. The support structure of claim 4, wherein the first radial channel provides non-filtering fluid communication between an exterior of the filter element and the first circumferential channel and the second radial channel provides non-filtering fluid communication between an inner core of the filter element and the second circumferential channel.

6. The support structure of claim 4, wherein the first radial channel provides non-filtering fluid communication between an inner core of the filter element and the first circumferential channel and the second radial channel provides non-filtering fluid communication between an exterior of the filter element and the second circumferential channel.

7. The support structure of claim 1, further comprising:
a top end cap; and
a bottom end cap, wherein the longitudinally-extending support surfaces of the second frame portion extend from the top end cap to the bottom end cap.

8. The support structure of claim 7, wherein the first radial channel extends from the top end cap to the bottom end cap.

9. The support structure of claim 1, wherein the longitudinally-extending support surfaces of the second frame portion are substantially rectangular.

10. The support structure of claim 1, wherein the radially-extending fingers of the first frame portion are substantially planar.

11. The support structure of claim 10, wherein the radially-extending fingers of the first frame portion are substantially rectangular.

12. The support structure of claim 10, wherein the radially-extending fingers of the first frame portion extend substantially perpendicular to the longitudinally-extending support surfaces of the second frame portion.

13. A support structure of a filter element for supporting a substantially continuous filter material that is adapted to filter a fluid, the support structure comprising:

a first frame portion having a pair of substantially planar, longitudinally-extending support surfaces that are disposed in a spaced, facing relationship with respect to one another, and a plurality of radially-extending fingers that are longitudinally spaced from one another, the first frame portion disposed entirely on an unfiltered side of the filter material;

a second frame portion having a pair of substantially planar, longitudinally-extending support surfaces that are disposed in a spaced, facing relationship with respect to one another, and a plurality of radially-extending fingers that are longitudinally spaced from one another, the second frame portion disposed entirely on a filtered side of the filter material;

the first frame portion and the second frame portion support the filter material to define a first circumferential channel and a first radial channel in non-filtering fluid communication with the first circumferential channel to provide fluid to or receive fluid from the first circumferential channel, wherein the filter material is interposed between each of the radially-extending fingers of the first frame portion and each of the longitudinally-extending support surfaces of the second frame portion, and the radially-extending fingers of the first frame portion space the longitudinally-extending support surfaces of the second frame portion apart from one another; and the first frame portion and the second frame portion support the filter material to define a second circumferential channel and a second radial channel in non-filtering fluid communication with the second circumferential channel to provide fluid to or receive fluid from the second circumferential channel, wherein the filter material is interposed between each of the radially-extending fingers of the second frame portion and each of the longitudinally-extending support surfaces of the first frame portion, and the radially-extending fingers of the second frame portion space the longitudinally-extending support surfaces of the first frame portion apart from one another, wherein the first circumferential channel is in filtering fluid communication with the second circumferential channel by passage of the fluid through the filter material.

14. The support structure of claim 13, further comprising:
the first frame portion having a plurality of longitudinally spaced ring members disposed within the first circumferential channel, each ring member of the first frame portion connected to both of the longitudinally-extending support surfaces of the first frame portion and to one of the radially-extending fingers of the first frame portion to support the radially-extending fingers of the first frame portion with respect to the longitudinally-extending support surfaces of the first frame portion; and the second frame portion having a plurality of longitudinally spaced ring members disposed within the second circumferential channel, each ring member of the second frame portion connected to both of the longitudinally-extending support surfaces of the second frame portion and to one of the radially-extending fingers of the second frame portion to support the radially-extending fingers of the second frame portion with respect to the longitudinally-extending support surfaces of the second frame portion.

15. The support structure of claim 13, wherein the first radial channel provides non-filtering fluid communication between an exterior of the filter element and the first circumferential channel and the second radial channel provides non-filtering fluid communication between an inner core of the filter element and the second circumferential channel.

16. The support structure of claim 13, wherein the first radial channel provides non-filtering fluid communication between an inner core of the filter element and the first circumferential channel and the second radial channel provides non-filtering fluid communication between an exterior of the filter element and the second circumferential channel.

17. The support structure of claim 13, further comprising:
a top end cap; and
a bottom end cap, wherein the longitudinally-extending support surfaces of the first frame portion extend from the top end cap to the bottom end cap and the longitudinally-extending support surfaces of the second frame portion extend from the top end cap to the bottom end cap.

18. The support structure of claim 17, wherein the first radial channel extends from the top end cap to the bottom end cap and the second radial channel extends from the top end cap to the bottom end cap.

19. The support structure of claim 13, wherein the longitudinally-extending support surfaces of the first frame portion and the second frame portion are substantially rectangular and further wherein the radially-extending fingers of the first frame portion and the second frame portion are substantially planar, substantially rectangular, and extend perpendicular to the longitudinally-extending support surfaces of the second frame portion and the first frame portion, respectively.

20. A support structure of a filter element for supporting a substantially continuous filter material that is adapted to filter a fluid, the support structure comprising:
   a top end cap;
   a bottom end cap;
   a first frame portion having a pair of substantially planar, longitudinally-extending support surfaces that are disposed in a spaced, facing relationship with respect to one another and extend from the top end cap to the bottom end cap, a plurality of radially-extending fingers that are longitudinally spaced from one another, and a plurality of longitudinally spaced ring members each connected to both of the longitudinally-extending support surfaces of the first frame portion and to one of the radially-extending fingers of the first frame portion to support the radially-extending fingers of the first frame portion with respect to the longitudinally-extending support surfaces of the first frame portion, the first frame portion disposed entirely on an unfiltered side of the filter material;
   a second frame portion having a pair of substantially planar, longitudinally-extending support surfaces that are disposed in a spaced, facing relationship with respect to one another and extend from the top end cap to the bottom end cap, a plurality of radially-extending fingers that are longitudinally spaced from one another, and a plurality of longitudinally spaced ring members each connected to both of the longitudinally-extending support surfaces of the second frame portion and to one of the radially-extending fingers of the second frame portion to support the radially-extending fingers of the second frame portion with respect to the longitudinally-extending support surfaces of the second frame portion, the second frame portion disposed entirely on a filtered side of the filter material;
   the first frame portion and the second frame portion support the filter material to define a first circumferential channel and a first radial channel that extends from the top end cap to the bottom end cap and is in non-filtering fluid communication with the first circumferential channel to provide fluid to or receive fluid from the first circumferential channel, wherein the filter material is interposed between each of the radially-extending fingers of the first frame portion and each of the longitudinally-extending support surfaces of the second frame portion, and the radially-extending fingers of the first frame portion space the longitudinally-extending support surfaces of the second frame portion apart from one another; and
   the first frame portion and the second frame portion support the filter material to define a second circumferential channel and a second radial channel that extends from the top end cap to the bottom end cap and is in non-filtering fluid communication with the second circumferential channel to provide fluid to or receive fluid from the second circumferential channel, wherein the filter material is interposed between each of the radially-extending fingers of the second frame portion and each of the longitudinally-extending support surfaces of the first frame portion, and the radially-extending fingers of the second frame portion space the longitudinally-extending support surfaces of the first frame portion apart from one another, wherein the first circumferential channel is in filtering fluid communication with the second circumferential channel by passage of the fluid through the filter material.

* * * * *